(12) United States Patent
Weller et al.

(10) Patent No.: US 10,087,009 B2
(45) Date of Patent: Oct. 2, 2018

(54) FOLDING MECHANISM FOR A CONVEYOR DEVICE

(71) Applicant: Kleemann GmbH, Göppingen (DE)

(72) Inventors: Christian Weller, Geislingen (DE); Felix Franzen, Nieder-Olm (DE)

(73) Assignee: Kleemann GmbH (DE)

( * ) Notice: Subject to any disclaimer, the term of this patent is extended or adjusted under 35 U.S.C. 154(b) by 0 days.

(21) Appl. No.: 15/558,081

(22) PCT Filed: Mar. 10, 2016

(86) PCT No.: PCT/EP2016/055207
§ 371 (c)(1),
(2) Date: Sep. 13, 2017

(87) PCT Pub. No.: WO2016/150727
PCT Pub. Date: Sep. 29, 2016

(65) Prior Publication Data
US 2018/0050872 A1    Feb. 22, 2018

(30) Foreign Application Priority Data
Mar. 25, 2015 (DE) .................. 10 2015 104 498

(51) Int. Cl.
*B65G 21/12* (2006.01)
*B65G 41/00* (2006.01)

(52) U.S. Cl.
CPC ........... *B65G 21/12* (2013.01); *B65G 41/002* (2013.01); *B65G 2201/04* (2013.01)

(58) Field of Classification Search
CPC .. B65G 21/12; B65G 41/002; B65G 2201/04; B65G 21/10; B07B 13/16
(Continued)

(56) References Cited

U.S. PATENT DOCUMENTS 3,684,255 A    8/1972 Rossi
5,333,725 A    8/1994 Douglas
(Continued)

FOREIGN PATENT DOCUMENTS

DE    10084078 T1    2/2002
EP      641607 A2    3/1995
(Continued)

OTHER PUBLICATIONS

International Search Report from corresponding PCT/EP2016/055207, dated Jun. 14, 2016, 16 pp.
(Continued)

*Primary Examiner* — Mark A Deuble
(74) *Attorney, Agent, or Firm* — Lucian Wayne Beavers; Patterson Intellectual Property Law, PC

(57) ABSTRACT

The invention relates to a conveyor device (20) for a material machining device (10), comprising a base portion (110) and a transport portion (24). The base portion (110) is designed for coupling to the material machining device (10) and is connected to the transport portion (24) via joint portion (30) such that the transport portion (24) is rotatable or pivotal and can be folded inwards about a longitudinal axis between an operation position and a transport position on at least one part of the adjustment path of the transport portion (24) by means of a first and a second rotary joint (36, 35). The joint portion (30) has a first and a second connection element (40, 80) and a joint central part (50); the first connection element (40) is equipped for directly or indirectly coupling to the material machining device (10), and the second connection element (80) is equipped for directly or indirectly coupling to the transport portion (24); and the connection elements (40, 80) and the joint central part (50) are coupled by means of the two rotary joints (35, 36). The conveyor device (20) can be mounted and used on both sides
(Continued)

of the material machining device (10) by means of the joint portion (30).

19 Claims, 4 Drawing Sheets

(58) Field of Classification Search
USPC .................................... 198/313, 581
See application file for complete search history.

(56) References Cited

U.S. PATENT DOCUMENTS

| | | | | |
|---|---|---|---|---|
| 5,498,119 A * | 3/1996 | Faivre | ...................... | B60P 1/36 |
| | | | | 198/313 |
| 6,543,622 B1 | 4/2003 | Fridman | | |
| 6,662,939 B1 * | 12/2003 | McCusker | ........... | B65G 41/002 |
| | | | | 198/316.1 |
| 7,552,818 B2 * | 6/2009 | Makinen | ............... | B65G 41/002 |
| | | | | 198/861.2 |
| 8,985,301 B2 * | 3/2015 | Werlinger | .............. | B65G 21/10 |
| | | | | 198/312 |
| 9,150,361 B2 * | 10/2015 | Murphy | ................. | B65G 21/10 |
| 9,376,260 B2 * | 6/2016 | Saarinen | ................ | B65G 21/14 |
| 2006/0088403 A1 | 4/2006 | Smith et al. | | |
| 2010/0282568 A1 * | 11/2010 | Whyte | .................. | B02C 21/026 |
| | | | | 198/313 |

FOREIGN PATENT DOCUMENTS

| | | |
|---|---|---|
| JP | 51162485 U | 12/1976 |
| WO | 2004096677 A1 | 11/2004 |

OTHER PUBLICATIONS

Office action dated Feb. 10, 2016 in corresponding German Application 10 2015 104 498.6, 8 pp.

* cited by examiner

FOLDING MECHANISM FOR A CONVEYOR DEVICE

BACKGROUND OF THE INVENTION

1. Field of the Invention

The invention relates to a conveyor device for a materials processing device, having a base portion and a transport portion, wherein the base portion is realized for coupling to the materials processing device and is connected to the transport portion by means of a joint portion in such a manner that the transport portion is rotatable or pivotable about a longitudinal axis by means of a first and a second rotary joint along at least part of the adjustment path of the transport portion between an operating position and a transport position and can be folded-in.

2. Description of the Prior Art

Document EP 1 628 896 B1 discloses a foldable conveyor belt which is attached to the side of a movable chassis. It consists of three part regions. A base region is connected fixedly to the chassis. A central region is connected pivotably to a base region, whilst an end region is mounted so as to be pivotable on the central region. A two-part support device connects the chassis to the end portion. The two part portions of the support device can be nested together in the manner of a telescope and fixed in a respective position. Three movable connections are formed. A first movable connection is realized between the first part portion of the support device and the chassis, a second movable connection is realized between the two part portions and a third movable connection is realized between the second part portion and the end region of the conveyor belt. The first and the third movable connections each enable two or three degrees of freedom of movement, whilst the second enables longitudinal adjustment and rotation. As a result of the support device, the conveyor belt can be held in its operating position. As a result of the movable connections, the support device is able to follow the movement of the conveyor belt when the conveyor belt is folded. The two outer part regions of the conveyor belt can thus be folded against the chassis, for example for transport purposes. As a result of the overlapping folding movement, the conveyor belt on the side of the chassis is aligned pointing forward or rearward such that it does not protrude upward beyond the chassis. In this case, the belt points with its surface in the direction of the chassis, as a result of which a smaller space requirement is achieved. The arrangement requires a plurality of movable components which have to be precisely matched to one another as regards their lengths and degrees of freedom. If one of the components is misaligned slightly in relation to the other movable components, for example under rough operating conditions as a result of external influences during the intended use, the movement is blocked. If, then, the introduction of force by the drive elements is not immediately interrupted, this can result in serious damage to the conveyor belt and to the associated support elements.

Document U.S. Pat. No. 8,113,332 B2 describes a conveyor system for a mobile screening unit. A three-part conveyor belt can be adjusted between an operating and a transport position. In the operating position, the three parts are aligned with respect to one another in a row. For transport, the outer end part of the conveyor system is folded-in about a first axis which runs transversely to the conveyor belt such that it lies parallel to a central part of the conveyor system. The central part is then folded-in about a second axis in relation to a base part. The first and the second axes are at an angle to one another. As a result, when folding about the second axis, the conveyor system is additionally rotated about its longitudinal axis such that the belt abuts longitudinally against the side of the screening unit aligned somewhat horizontally. In this case, the belt is aligned with its transport surface toward the screening unit. Many movably mounted connecting elements, which are designed for a sufficient load-bearing capacity in the operating position and the necessary mobility of the central part in relation to the base part, are necessary between the base part and the central part in this case too. Consequently, in this case too, there is the disadvantage of the components still having to be aligned precisely to one another after a long operating period and after heavy mechanical stresses in order to ensure the complex movement sequence.

EP 2 137 090 B1 discloses a materials processing apparatus with a conveyor. In a folded-out state, the conveyor protrudes laterally from the device and can be folded-in against the conveyor in such a manner and at the same time rotated about its longitudinal axis that its front or rear side faces the device. The conveyor is connected to the apparatus by way of a corresponding joint connection which enables two rotational movements which are perpendicular to one another. A rigid connecting element is arranged above or below the conveyor and is fastened so as to be movable on one side of the conveyor and on the apparatus. A linear actuating element is arranged between the conveyor and the connecting element. When extended, the linear actuating element realizes the one side of the conveyor and the connecting element realizes a triangle. When the linear actuating element is retracted, the side of the conveyor is pulled approximately parallel to the connecting element. In this case, the conveyor is rotated about the two rotational axes of the joint connection such that it bears laterally against the materials processing device.

WO 2013/057300 describes a materials processing device with a conveyor belt which is arranged protruding laterally in an operating position. For transport, the conveyor belt can be folded about a first joint connection onto the materials processing device. In this case, a rotational movement of the conveyor belt is effected in such a manner that it abuts against a first side of the materials processing device by way of its front or rear side. The end of the conveyor belt now protruding beyond the first side of the materials processing device can be folded down by means of a second joint connection such that it abuts against a second side of the materials processing device. The first joint connection is formed by a rotational axis arranged at an angle, about which the central part of the conveyor belt is rotated to the materials processing device.

A disadvantage of said disclosed folding mechanisms is additionally that the joints are arranged in such a manner that there is always a combined rotational movement of the conveyor belt about its longitudinal axis and at the same time a folding movement of the conveyor belt to the materials processing device. It is not possible to actuate and carry out the two movements separately. As a result, the joint connections have to be structurally modified when the conveyor belt is to be provided for different materials processing devices or when the same conveyor belt is to be used at different positions on the materials processing device.

SUMMARY OF THE INVENTION

It is an object of the invention to provide a sturdy folding mechanism for a conveyor device which is able to be adapted individually to the respective installation site of the conveyor device.

The object of the invention is achieved in that the joint portion comprises a first and a second connection element and a joint central part, that the first connection element is provided for indirect or direct coupling to the materials processing device and the second connection element is provided for indirect or direct coupling to the transport portion, and that the connection elements and the joint central part are coupled by means of the two rotary joints. As a result of the rotary joints being arranged in a row, the rotating or pivoting about the longitudinal axis, on the one hand, and the folding-in, on the other hand, are able to be actuated and carried out independently of one another. Consequently, the movement sequence can be adapted individually to the spatial conditions of the mobile materials processing device without the joint central part or the connecting element having to be structurally modified. This makes it possible, for example, to couple the conveyor device to the mobile materials processing device both on the right and on the left and to adjust, in a corresponding manner, the rotating or pivoting about the longitudinal axis and the folding-in in the necessary direction, for example rearward in the direction of travel of the mobile materials processing device. At the same time, the design is compact with a smaller amount of expenditure on parts and assembly, as a result of which the production and assembly costs of the conveyor device can be clearly reduced compared to known folding mechanisms.

Simple mounting of the conveyor device on both sides of the mobile materials processing device can be achieved in that the first connection element comprises a mechanical interface, by way of which it is couplable as an option to one of the two sides of the materials processing device so as to be releasable.

The mounting of the conveyor device can be additionally simplified in that the second connection element comprises a mechanical interface, by way of which it is couplable with the transport portion so as to be releasable. The interface makes it possible to use the identical joint central part for conveyor belts with transport portions that are of varying lengths.

A simple joint connection which, at the same time, is able to withstand heavy loads can be achieved in that the joint central part comprises a first joint receiving means which is in alignment with a second joint receiving means of the first connection element or of the second connection element, and that the joint receiving means are coupled together by way of a second bearing bolt to form the first rotary joint.

According to a preferred design of the invention, it can be provided that fastened on the joint central part is a first bearing sleeve, the longitudinal axis of which is aligned toward the second connection element, that fastened on the second connection element is a second bearing sleeve, the longitudinal axis of which is aligned to the longitudinal axis of the first bearing sleeve and that a bearing bolt is rotatably mounted in one of the bearing sleeves and is fastened non-rotatably in the other bearing sleeve. In this way, a rotary joint is created, about the rotational axis of which the longitudinal axis of the front transport portion can be rotated or pivoted. As a result of choosing the bearing sleeves and the bearing bolt suitably, the rotary joint can be realized in a smooth-running and nevertheless sturdy manner such that even high transverse forces acting on the transport portion of the conveyor device can be reliably absorbed. The rotary bearing can be produced in a cost-efficient manner and is simple to mount.

A simple design of the joint portion can be achieved in that the joint central part receives the two rotary joints and that the rotational axes of the two rotary joints are arranged at an angle, preferably of 90°, with respect to one another. The arrangement of the rotary joints at an angle enables the rotating and pivoting movement to be carried out about the longitudinal axis of the transport portion and the folding-in movement thereof. If the two rotational axes are arranged at an angle of 90°, many positions of the transport portion can be adjusted as its transport position. In this case, a suitable alignment of the two rotational axes enables the rotating and pivoting movement about the longitudinal axis of the transport portion and the folding-in movement to be separated from one another and consequently to be able to be actuated individually and independently of one another.

Separation of the rotating and pivoting movement about the longitudinal axis of the transport portion, on the one hand, and the folding-in movement of the transport portion, on the other hand, can be achieved in that a second rotational axis of the second rotary joint is aligned in the direction of the longitudinal extension of the transport portion and that a first rotational axis of the first rotary joint is aligned at an angle with respect to the first rotational axis. As a result of the second rotational axis being aligned in the direction of the longitudinal extension of the transport portion, it can be rotated or pivoted about its longitudinal axis without this influencing the folding movement of the transport portion. Correspondingly, the transport portion can be folded-in about the first rotational axis of the first rotary joint without this influencing the rotating or pivoting about the longitudinal axis of the transport portion. The two movements can be actuated and carried out separately from one another in this manner. Consequently, the movements of the transport portion can be adapted optimally and without structural modifications to the joint portion to the respective installation situation of the conveyor device.

If it is provided that the second rotary joint has assigned thereto a first and/or the first rotary joint has assigned thereto a second actuator, the rotating and pivoting movements about the longitudinal axis of the transport portion, on the one hand, and the folding-in movement of the transport portion, on the other hand, can be actuated independently of one another.

It can be provided in a preferred manner that the joint central part comprises a coupling element which is connected to the second actuator in order to fold-in the transport portion. The second actuator can thus be connected simply and quickly to the joint central part. The joint central part can then be folded-in about the first rotary joint by means of the second actuator. The coupling of the second actuator to the joint central part is advantageous as said joint central part is always realized in an identical manner independently of the provided transport portion and consequently a standard design, for example of variously long conveyor belts, can be achieved.

According to a preferred design of the invention, it can be provided that the joint central part comprises a first and a second coupling element, or that the joint central part comprises a coupling element which is arranged in such a manner that it is couplable with the second actuator optionally on the left or right side of the joint central part. The first and the second coupling elements can be arranged, for example, situated opposite on the sides of the joint central part. The second actuator can then be connected to the first or the second coupling element in dependence on the desired folding direction. Correspondingly, the folding direction can also be chosen by a coupling element which is couplable with the second actuator as an option on the left or right side of the joint central part.

The rotating or pivoting movement of the transport portion about its longitudinal axis can be brought about in that the first actuator acts between the joint central part and the second connection element in such a manner that it rotates or pivots the transport portion about a longitudinal axis. The arrangement of the first actuator between the joint central part and the second connecting element produces a design which can be realized independently of the coupling of the conveyor device to the materials processing device. The arrangement can consequently be used without structural modifications with many conveyor belts and models of materials processing devices.

In order to be able to achieve both a right-hand and a left-hand rotation of the transport portion, it can be provided that the first actuator is fastenable on the joint central part in two different mounting positions in dependence on the chosen method of attachment of the transport portion on the materials processing device.

Precise alignment of the transport portion of the conveyor device, in particular in its operating position, can be achieved in that a stop element is operative between the joint central part and one of the connection elements for limiting the rotating/pivoting or folding movement of the transport portion.

It can preferably be provided, in this case, that the alignment of the transport portion about the longitudinal axis thereof is adjustable by means of an adjusting element (adjustable stop element). The rest positions of the transport portion can thus be determined in a precise manner.

A locking position of the second rotary joint can be adjusted in that at least one locking pin is fixable on the joint central part, that the stop element arranged on the second connection element abuts against the locking pin in the locked position of the second rotary joint at least in one direction of rotation of the second rotary joint and that the position of the stop element is adjustable in relation to the second connection element. The locking pin can be removed and consequently the rotational movement released for rotating or pivoting and folding-in the transport portion.

The alignment of the first rotary joint in the operating position of the transport portion can be fixed in that a support strut is operative between the joint portion, preferably the joint central part, and the materials processing machine. The support strut can be fixed for this purpose by way of one side, for example on the base portion of the conveyor device and, once the operating position has been achieved, can be connected to the joint portion. The support strut prevents the transport portion unintentionally rotating about the first rotational axis if transverse forces arise, for example counter the adjusting action of the second actuator.

BRIEF DESCRIPTION OF THE DRAWINGS

The invention is explained in more detail below by way of an exemplary embodiment shown in the drawings, in which.

DETAILED DESCRIPTION

Figure 1:
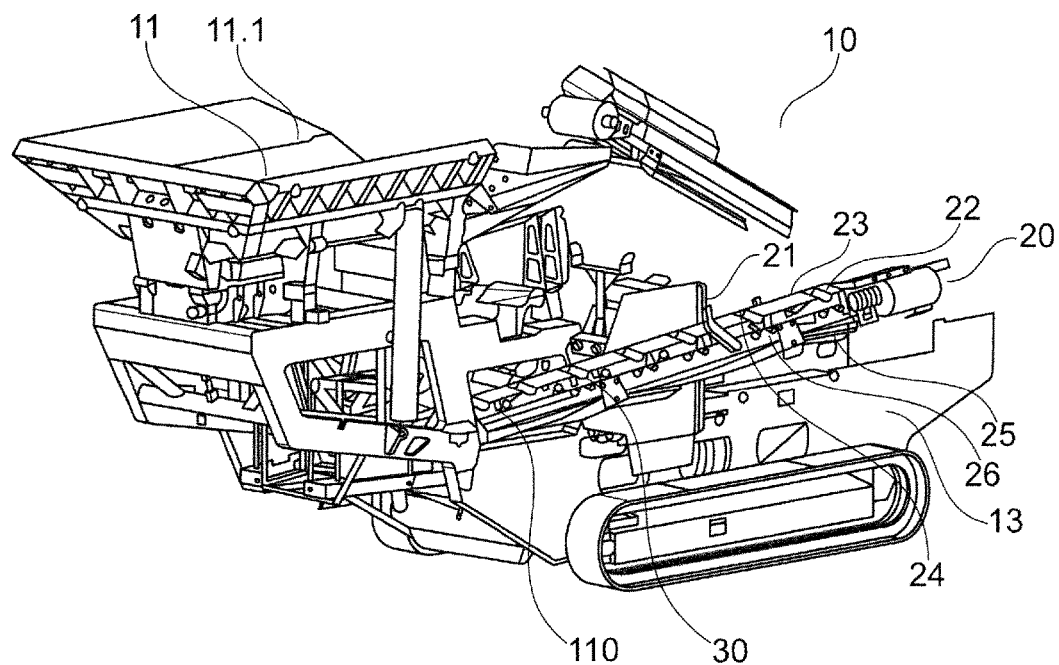
FIG. 1 shows a mobile materials processing device in an operating position.

FIG. 1 shows a mobile materials processing device 10 in an operating position. The materials processing device 10 serves for crushing excavation material which is fed to the materials processing device 10 via a feed hopper 11 with funnel walls 11.1. The material is removed by means of a conveyor device 20. Conveyor device 20 may also be referred to as a conveyor connector apparatus 20. The conveyor device 20 is connected to a chassis 13 of the mobile materials processing device 10 by means of a base portion 110. A transport portion 24 of the conveyor device 20 is coupled to the base portion 110 by means of a joint portion 30. A belt 23 of the conveyor device 20 is guided along a support profile 26 of the transport portion 24. To this end, it is mounted on rollers 22 and held laterally by lateral belt guides 21 and on the bottom side of the conveyor device 20 by bottom belt guides 25.

The base portion 110 is connected to the chassis 13 so as to be movable in such a manner that the inclination of the conveyor device 20 is able to be adjusted.

Figure 2:
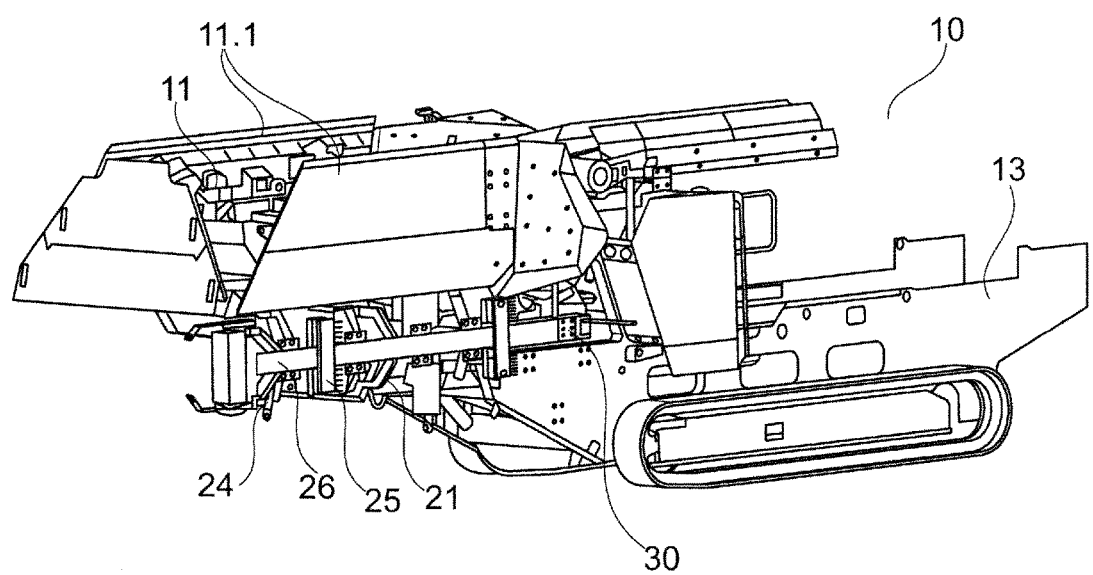
FIG. 2 shows the mobile materials processing device shown in FIG. 1 in a transport position.

FIG. 2 shows the mobile materials processing device 10 shown in FIG. 1 in a transport position. In said transport position, the funnel walls 11.1 of the feed hopper 11 are folded downward and the return guide 12 is retracted. As a result, the height of the materials processing device 10 is clearly reduced in relation to the operating position.

The transport portion 24 of the conveyor device 20 is rotated about its longitudinal axis and is folded against the chassis 13 of the mobile materials processing device 10. To this end, the base portion 110, and consequently the entire conveyor device 20, is initially lowered until, with the materials processing device 10 standing horizontally, it is aligned at least approximately horizontally standing out from the side of the mobile materials processing device 10 in its longitudinal extension. The transport portion 24 is then rotated or pivoted about its longitudinal axis at the joint portion 30 and folded against the chassis 13. Said two movement sequences are preferably coordinated with one another such that they run at the same time. As an alternative to this, the rotating or pivoting about the longitudinal axis can be effected initially followed by the folding-in against the chassis 13.

As a result of the folding-in of the conveyor device 20 and the rotating or pivoting about its longitudinal axis, the lateral dimensions of the mobile materials processing device 10 are reduced to such an extent that it is able to be transported on public roads.

Figure 3:
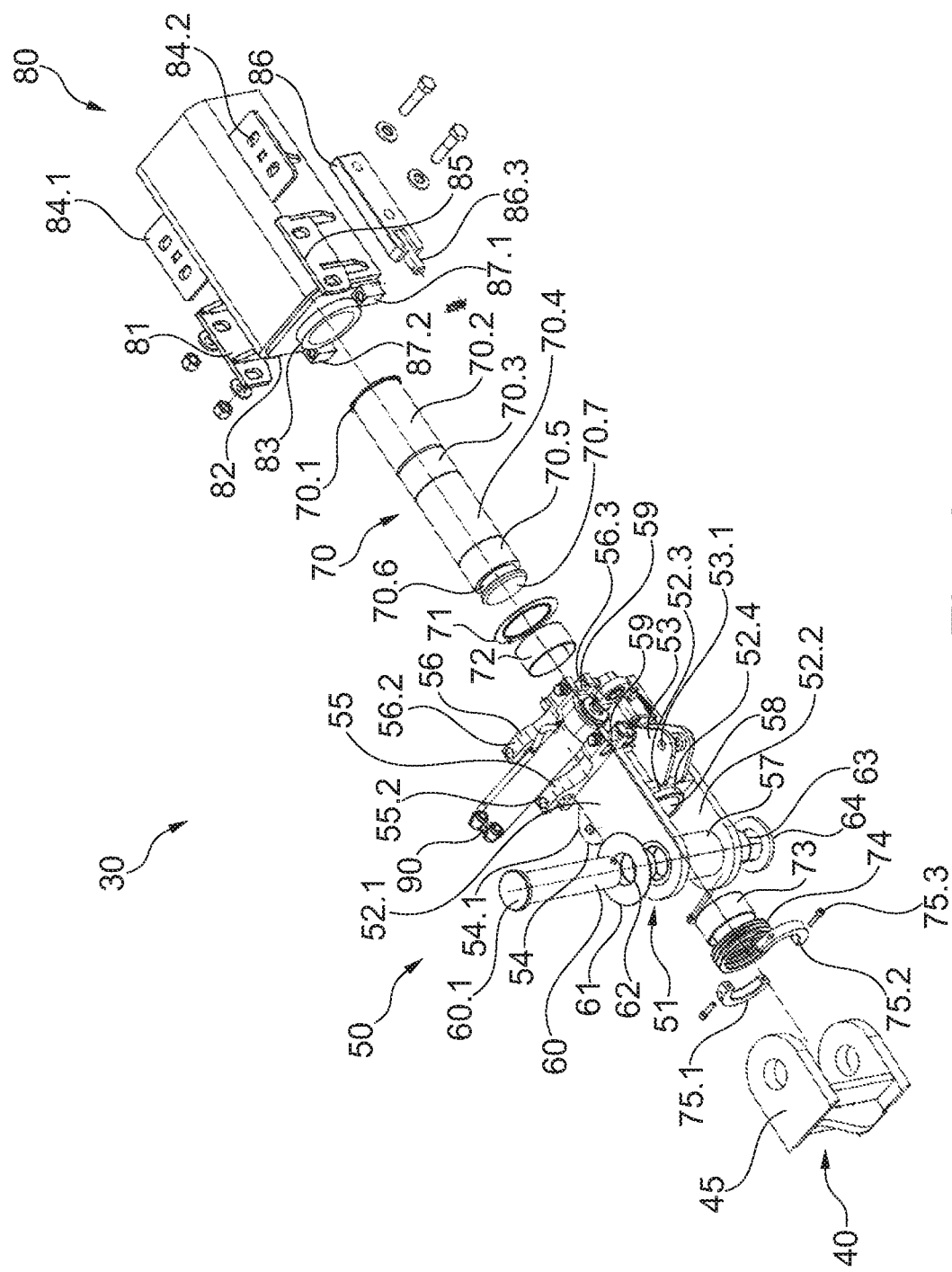
FIG. 3 shows an exploded representation in perspective of a joint portion of a conveyor device.

FIG. 3 shows an exploded representation in perspective of the joint portion 30 of the conveyor device 20.

A first connecting element 40 is realized for connecting the joint portion 30 to the base portion 110. A joint central part 50, which has assigned thereto a bearing bolt 70, follows the first connection element 40. The bearing bolt 70 may also be referred to as a bearing pin 70. A second connection element 80 is designed to connect the joint portion 30 to the support profile 26 of the transport portion 24 of the conveyor device 20.

Facing the joint central part 50, the first connecting element 40 comprises a first joint receiving means 45. Joint receiving means 45 may also be referred to as a joint receptacle 45. The connection element additionally comprises mounting bores for connecting the first connecting element 40 to the base portion 110.

The joint central portion 50 comprises a top plate 52.1 and a bottom plate 52.2. The two plates 52.1, 52.2 are connected together at a spacing by a transverse web 52.3 and a first and a second fastening web 55, 56. A second joint receiving means 51 is arranged on the side of the joint central part 50 facing the first connecting element 40. Joint receiving means 51 may also be referred to as a joint receptacle 51. Said second joint receiving means includes a third bearing sleeve 57. The third bearing sleeve 57 is held in two oppositely situated, aligned bores in the top and the bottom plates 52.1, 52.2.

Coupling elements 53, 54 are arranged between the transverse web 52.3 and the first fastening web 55, protruding laterally and located opposite one another in each case, and are fastened to said webs. The coupling elements 53, 54 are formed in each case by two cantilevers 53.1, 54.1 which are arranged in a spaced manner. Two bores, which are aligned with one another, are arranged on the outside in each of said cantilevers 53.1, 54.1.

The fastening webs 55, 56 each comprise two oppositely situated receiving means 55.2, 55.3, 56.2, 56.3 which are aligned toward the side of the joint central part 50 and are open. The receiving means 55.2, 55.3, 56.2, 56.3 are realized in a U-shaped manner. Bores are admitted in the oppositely situated legs of the receiving means 55.2, 55.3, 56.2, 56.3. The receiving means 55.2, 55.3, 56.2, 56.3 can be closed by bearing bolts 59 which are inserted into the bores.

A first bearing sleeve 58 is arranged between the top and the bottom plates 52.1, 52.2. The bearing sleeve 58 is held in sleeve breakthroughs 52.4 in the transverse web 52.3 and the first and the second fastening webs 55, 56. The bearing sleeve 58 is aligned with its center longitudinal axis toward the bearing bolt 70 and the second connecting element 80.

A first actuator 90 is mounted so as to be movable in two receiving means 55.3, 56.3 which are arranged on one side of the joint central part 50, as is described in more detail in connection with FIGS. 4 and 5.

A second bearing bolt 60 is shown in alignment with the third bearing sleeve 57 of the second joint receiving means 51. The second bearing bolt 60 may also be referred to as a second bearing pin 60. A bolt flange 60.1 is integrally molded on the end of the second bearing bolt 60. A first split pin bore 60.2 is admitted into the second bearing bolt 60 located opposite the bolt flange 60.1. A first axial bearing 61 and a first radial bearing 62, which is arranged in a partially concealed manner, are shown between the second bearing bolt 60 and the third bearing sleeve 57. A second radial bearing 63 and a fastening disk 64 are arranged situated opposite the bearing sleeve 57.

The bearing bolt 70 is aligned with its center longitudinal axis aligned with the first bearing sleeve 58. A stop 70.1 is integrally molded on the end of the bearing bolt 70. The stop 70.1 is followed by a press-in portion 70.2, a first bearing portion 70.3, a central portion 70.4, a second bearing portion 70.5, a groove 70.6 and a closure flange 70.7 of the bearing bolt 70. A second axial bearing 71 and a third radial bearing 72 are shown between the bearing bolt 70 and the joint central part 50. A fourth radial bearing 73, spacers 74 and a first and a second half shell 75.1, 75.2 of a clamping ring, which can be mounted by means of screws 75.3, are arranged on the oppositely situated side of the joint central part 50.

The second connecting element 80 comprises a U-profile as a basic body. A second bearing sleeve 83 is guided inside the U-profile and held in a sleeve breakthrough of a closure plate 82. The second bearing sleeve 83 is aligned with its center longitudinal axis toward the bearing bolt 70. Mounting plates 81, 85 are fastened at the side on the U-profile 84 in a spaced manner. Two brackets 84.1, 84.2 are mounted on the U-profile 84 following the mounting plates 81, 85. A journal carrier 86 is arranged on one side of the U-profile. The journal carrier 86 is fastened on the second mounting plate 85 in the present alignment. A journal 86.3 is fastened on the journal carrier 86 toward the joint central part 50. Two stop webs 87.1, 87.2 are arranged situated opposite one another in the transition from the U-profile to the connection plate 82.

For mounting the joint portion 30, the bearing bolt 70 is introduced into the second bearing sleeve 83 from the side of the transport portion 24 of the conveyor device 20 and secured therein by way of its press-in portion 70.2. The third and the fourth radial bearings 72, 73 are introduced into the first bearing sleeve 58. The second axial bearing 71 is slid onto the bearing bolt 70 up to the second bearing sleeve 83. The joint central part 50 is then slid onto the bearing bolt 70 by way of its first bearing sleeve 58 in such a manner that the first bearing portion 70.3 of the bearing bolt is rotatably mounted in the region of the third radial bearing 72 and the second bearing portion 70.5 is rotatably mounted in the region of the fourth radial bearing 73. When mounted, the bearing bolt 70 with its groove 70.6 and the closure flange 70.7 projects out of the first bearing sleeve 58. It can thus be axially secured by means of the two half shells 75.1, 75.2 which are inserted into the groove 70.6 and are connected together. Prior to this, the axial play of the bearing bolt 70 is adjusted by means of the spacers 74 which are arranged between the first bearing sleeve 58 and the half shells 75.1, 75.2. A joint connection, by way of which the second connecting element 80 can be rotated or pivoted about its longitudinal axis in relation to the joint central part 50, is obtained by way of said arrangement. For further mounting, the first radial bearing 62 and the second radial bearing are introduced into the end of the third bearing sleeve 57 and are secured there. The first axial bearing 61 is designed to be in alignment with the opening of the third bearing sleeve 57. The joint central part 50 is then slid between the flanges of the first connecting element 40 in such a manner that the first joint receiving means 45 and the second joint receiving means 51 are in alignment with one another. The two joint receiving means 45, 51 can then be connected so as to be foldable by introducing the second bearing bolt 60. The second bearing bolt 60 is axially secured by means of a split pin.

The joint portion 30 consequently includes two joints which are arranged together in a row, the rotational axes of which are arranged at an angle with respect to one another. In this case, the joint arranged between the first connection element 40 and the joint central part 50 enables the transport portion 24 of the conveyor device 20 connected to the second connecting element 80 to be folded in, whilst the joint arranged between the joint central part 50 and the second connecting element 80 enables the transport portion 24 to rotate or pivot about its longitudinal axis. The joint central part 50 is designed such that both the folding-in and the rotating or pivoting of the transport portion 24 about its longitudinal axis is possible in each case in both directions.

It is thus possible for the conveyor device 20 to be attached on each side of the mobile materials processing device and to be folded-in in a suitable manner.

As shown in FIG. 3, the first bearing sleeve 58 is fastened in the first sleeve breakthrough 52.4 and can be connected to the first fastening webs 55, 56. The second bearing sleeve 83 is held in sleeve breakthroughs in the connecting plate 82 and in a second transverse web 89 and is fixedly connected to both of these. Together with the sturdily realized bearing bolt 70, a connection which is able to withstand heavy loads and is at the same time rotatable is thus produced between the joint central part 50 and the second connecting element 80.

Consequently, a first rotary joint 35 is realized between the first connecting element 40 and the joint central part 50 and a second rotary joint 36 is realized between the joint central part 50 and the second connecting element 80. The rotational axes of the two rotary joints 35, 36 are aligned at an angle with respect to one another. The angle is preferably 90°.

The first rotary joint 35 consequently enables the folding-in of the joint central part 50 with the second connecting element 80 coupled thereon and consequently the transport portion 24 of the conveyor device 20. The transport portion 24 of the conveyor device 20 can thus be folded against the chassis 13 of the materials processing device 10, as shown in FIG. 2. The rotating about the rotational axis of the first rotary joint 35 can be effected clockwise or anti-clockwise depending on the drive provided. It is also possible to choose the angle of rotation freely. As a result, it is possible to mount the conveyor device 20 on an arbitrary side of the mobile materials processing device 10 and to fold it in there for transport purposes.

The rotational axis of the second rotary joint 36 runs in the direction of the longitudinal extent of the second bearing sleeve 83. The rotational axis of the second rotary joint 36 is consequently aligned in the direction of the longitudinal extension of the second connecting element 80 and of a transport portion 24 of the conveying device 20 connected thereto and shown in FIGS. 1 and 2. The second rotary joint 36 consequently enables rotating or pivoting of the second connecting element 80, and consequently of the transport portion 24 of the conveyor device 20, about the longitudinal axes thereof. The rotating about the rotational axis of the second rotary joint 36 can be effected, in this case, clockwise or anti-clockwise depending on the drive provided. It is also possible to choose the angle of rotation freely. Consequently, the transport portion 24 can be folded against the chassis 13 in the transport position, for example with its top side or its bottom side aligned toward the chassis 13, or the side on which the conveyor device 20 is mounted on the materials processing device 10 can be freely chosen.

Figure 4:
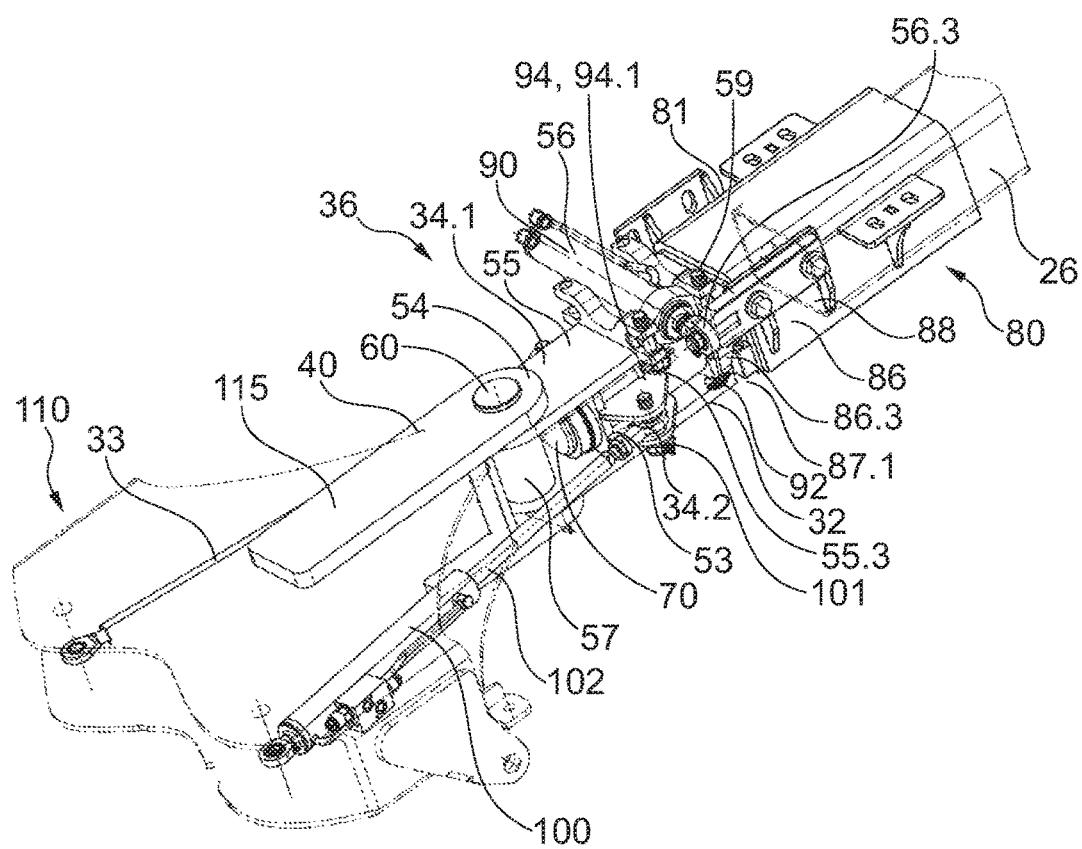
FIG. 4 shows a perspective representation of a joint portion with mounted actuators, with the conveyor device in an operating position

FIG. 4 shows a perspective representation of a joint portion 30 with mounted actuators 90, 100, with the conveyor device 20 in an operating position.

The first connecting element 40 is releasably connected to a connecting portion 115 of the base portion 110 by means of corresponding fastening elements (screws). A support strut 33 is releasably connected to the base portion 110. The support strut 33 is fastened on the second coupling element 54 at its second end. Located opposite the support strut 33, a second actuator 100, which is realized as a hydraulic cylinder, connects the base portion 110 to the joint central part 50. The first actuator 90 is also realized as a hydraulic cylinder. It comprises a first joint head 92 and a first piston rod 93 which is retracted in the chosen representation and shown in FIG. 5. The first actuator 90 is held by means of a hinge 94. Laterally protruding journals 94.1 are rotatably mounted in the second receiving means 55.3 of the first fastening web 55 and in the fourth receiving means 56.3 of the second fastening web 56. To this end, the journals 94.1, mounted opposite on the hinge 94, are introduced into the second or fourth U-shaped receiving means 55.3, 56.3 and the openings of the second and fourth receiving means are closed by means of bearing bolts 59. The first joint head 92 is placed with a through-hole onto the journal 86.3 of the journal carrier 86 and is held there by means of a screw. The first actuator 90 is consequently arranged laterally and transversely with respect to the rotational axis of the second rotary joint 36.

The U-profile 84 of the second connecting element 80 is connected releasably by means of suitable fastening means (screws) to the support profile 26 of the transport portion 24 of the conveyor device 20.

An adjustable stop element 32, in the present embodiment in the form of a screw, is mounted on the first stop web 87.1.

Figure 5:
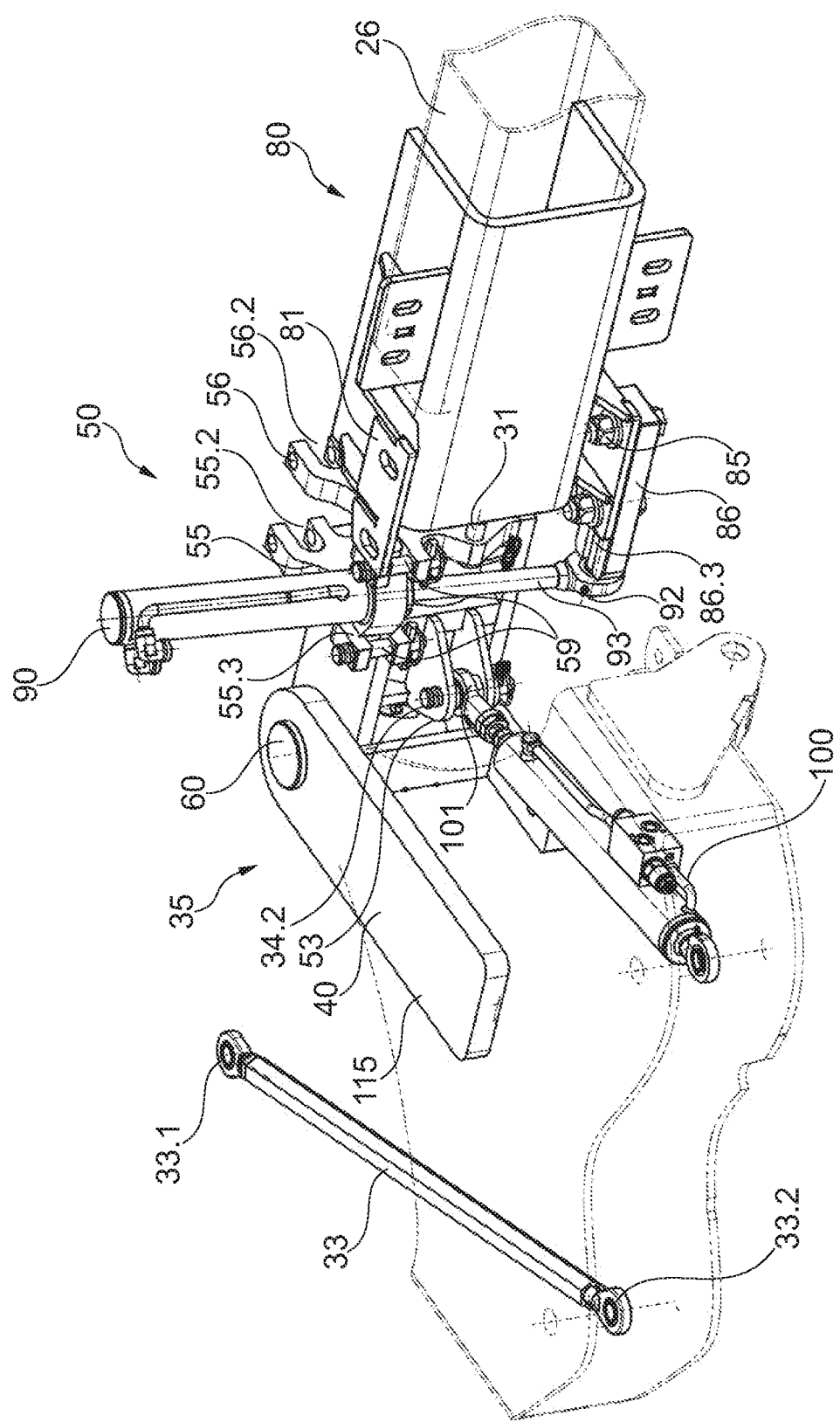
FIG. 5 shows the joint portion shown in FIG. 4 in a transport position.

As a result of retracting the second piston rod 102 of the second actuator 100, the joint central part 50 is rotated about the rotational axis of the first rotary joint 35, as is shown in FIG. 5. As a result of extending the first piston rod 93 of the first actuator 90, the second connecting element 80 is rotated about the rotational axis of the second rotary joint 36, as is also shown in FIG. 5. As a result of said movement sequences, the support profile 26, and consequently the transport portion 24 of the conveyor device 20 fastened on the support profile 26, can be folded-in about the rotational axis of the first rotary joint 35 and rotated or pivoted about the rotational axis of the second rotary joint 36.

FIG. 5 shows the joint portion 30 shown in FIG. 4 with the conveyor device 20 in a transport position.

The support strut 33 is released from the second coupling element 54. The second piston rod 102 of the second actuator 100 is retracted. The first piston rod 93 of the first actuator 90 is extended.

As a result of retracting the second piston rod 102 of the second actuator 100, the joint central part 50 with the coupled second connecting element 80 is rotated about the rotational axis of the first rotary joint 35.

As a result of extending the first piston rod 93 of the first actuator 90, the second connecting element 80 is rotated or pivoted about its longitudinal axis. As the first actuator is held fixedly on the joint central part 50 at its housing by means of the hinge 94, the bearing bolt 70, which is rotatably mounted in the first bearing sleeve 58 of the joint central part 50, is rotated, in this case, and consequently the connected second connecting element 80. The first actuator 90 is itself rotated, in this case, about a rotational axis formed by the hinge journal 94.1.

For folding-in the transport portion 24 from its operating position into its transport position, first of all the inclination of the conveyor device 20 is adjusted. To this end, the base portion 110 is pivoted about a bearing assigned to it and the conveyor device is consequently tilted downward. The adjusting of the inclination is effected by means of a further actuator, which is not shown, for example a further hydraulic cylinder. Once the inclination has been adjusted and the support strut 33 released, the first actuator 90 is extended and the second actuator 100 retracted. The two movements, in this case, can be effected at the same time or one after the other. As a result, the support profile 26, which is mounted on the second connecting element 80, and consequently the transport portion 24 of the conveyor device, is rotated or pivoted about its longitudinal axis and folded-in to the chassis 13 of the mobile materials processing device 10.

To fold-out the transport portion 24 from its transport position into the operation position, the first actuator 90 is retracted and the second actuator 100 is extended. As a result, the joint central part 50 is rotated about the first rotational axis again and the second connecting element 80, and consequently the transport portion 24, is rotated or pivoted about its longitudinal axis. In order to align the transport portion 24 precisely in its operating position, the support strut 33 is then mounted, as shown in FIG. 4. The support strut 33 continues to absorb transverse forces acting on the transport portion 24 such that the transport portion 24 is not rotated out of its operating position about the first rotational axis 35 counter the adjustment of the second actuator 100. A locking pin 31 is secured on the second fastening web 56 of the joint central part 50. The stop element 32 shown in FIG. 4 impacts against said locking pin when the second connecting element 80 is rotated into the operating position. The position of the stop element 32 can be adjusted. The precise position of the transport portion 24 is consequently predetermined.

The assemblies of the joint portion 30 are arranged symmetrically on both sides of the joint portion 30. Consequently, the components which bring about the movement of the transport portion 24 can be mounted on both sides. If, for example, the second actuator 100 is connected to the second coupling element 54, the joint central part 50, and consequently the transport portion 24 of the conveyor device, can thus be folded-in about the first rotational axis 35 in the opposite direction to in the case of the realization shown where the second actuator 100 is connected to the first coupling element 53. Correspondingly, the first actuator 90 can be secured with its hinge journals 94.1 in the oppositely situated first and second receiving means 55.2, 56.2 and the journal carrier 86 can be fastened on the oppositely situated first mounting plate 81. As a result, the second connecting element 80, and consequently the connected transport section 24, is rotated or pivoted about its longitudinal axis in the opposite direction to the case in the exemplary embodiment shown in FIG. 5. In this way, the conveyor device 20 can be mounted, for example, on the right or the left of the materials processing device 10 using an identical joint portion 30. In addition, the choice can be made as to whether the transport portion 24 is folded-in aligned toward the chassis with its top side or its bottom side. A further advantage is produced from the independent actuation of the two rotational movements, as is produced from the independent actuators 90, 100 used and the chosen rotational axes of the two rotary joints 35, 36. Thus it can be freely chosen how far the transport portion 24 is folded about the first rotary joint 35 against the chassis 13. In addition, it can be freely chosen how strongly the transport portion 24 is rotated or pivoted about its longitudinal axis. Consequently, the movement can be adapted optimally to the space conditions produced from the design of the materials processing device 10. The identical joint portion 30 can thus also be used for various materials processing devices 10.

As a result of the movable bearing arrangement of the base portion 110, the inclination of the conveyor device 20 and consequently the conveyor height can be adjusted. The inclination of the base portion 110 with the transport portion 24 folded-in can also be adjusted. The base portion 110 is preferably aligned horizontally in the transport position with the materials processing device being in the horizontal position. However, it can also be adjusted at an inclination, as a result of which the transport portion 24 abuts somewhat higher or lower against the side of the chassis 13. In this case, the transport portion 24 can continue to be placed flatly against the side of the chassis 13 as a result of the freely selectable angle of rotation about the second rotational axis 36. The position of the transport portion 24 is also able to be adapted optimally to the spatial conditions of a mobile materials processing device 10 as a result.

One of the rotational axes of the two rotary joints 35, is aligned in an advantageous manner almost approximately in the direction of the longitudinal axis of the transport portion 24 of the conveyor device. In the exemplary embodiment shown, the rotational axis of the second rotary joint 36 can be aligned lying directly along the longitudinal axis of the transport portion 24 or parallel to the longitudinal axis. In the first case, the transport portion 24 is rotated about its longitudinal axis, in the second case it is pivoted about the same. Consequently, the rotating or pivoting movement about the longitudinal axis and the folding-in movement can be adjusted and carried out separately and independently of one another. The transport position can thus be adapted optimally to the spatial conditions of the materials processing device 10. This is not possible in the case of known joint arrangements with rotational axes aligned at an angle to the longitudinal axis of the transport portion 24 or of the second connection element 80, as here rotation about one of the rotational axes always produces a combined rotating or pivoting movement and fold-in movement which are not adjustable independently of one another.

The first case of the rotational axis of the second rotary joint 36 being aligned lying directly along the longitudinal axis of the transport portion 24 can also be described as the rotational axis of the second rotary joint being co-axial with the longitudinal axis of the conveyor transport portion so that the conveyor transport portion can be rotated about the longitudinal axis of the conveyor transport portion relative to the base portion.

The second case of the second rotary joint 36 being parallel to the longitudinal axis of the transport portion 24 can also be described as the rotational axis of the second rotary joint being parallel to and laterally offset from the longitudinal axis of the conveyor transport portion so that the longitudinal axis of the conveyor transport portion can be pivoted about the rotational axis of the second rotary joint.

The invention claimed is:

1. A conveyor connector apparatus for a materials processing machine, the materials processing machine including a base portion and a conveyor transport portion, the base portion being connected to the materials processing machine, the conveyor connector apparatus comprising:
   a joint portion configured to connect the conveyor transport portion to the base portion, the joint portion including:
      a first connection element configured to be directly or indirectly coupled to the base portion;
      a second connection element configured to be directly or indirectly coupled to the conveyor transport portion; and
      a joint central part including a first rotary joint connected to the first connection element and configured such that the conveyor transport portion can be can be folded-in from an operation position to a transport position relative to the base portion, and a second rotary joint connected to the second connection element and configured such that the conveyor transport portion can be rotated or pivoted about a rotational axis of the second rotary joint;
   wherein the first and second rotary joints have first and second rotational axes, respectively;

wherein the second rotational axis of the second rotary joint is parallel to a direction of longitudinal extension of the conveyor transport portion; and wherein the first rotational axis is at an angle with respect to the second rotational axis.

2. The conveyor connector apparatus of claim 1, wherein: the first connection element is configured to be releasably coupled to the base portion on either one of two sides of the material processing machine.

3. The conveyor connector apparatus of claim 1, wherein: the second connection element is configured to be releasably coupled to the conveyor transport portion.

4. The conveyor connector apparatus of claim 1, wherein the first rotary joint comprises:
   a first joint receptacle defined on the first connection element;
   a second joint receptacle defined on the joint central part and aligned with the first joint receptacle; and
   a bearing pin received in the first and second joint receptacles.

5. The conveyor connector apparatus of claim 1, wherein the second rotary joint comprises:
   a first bearing sleeve defined on the joint central part and having a first bearing sleeve longitudinal axis;
   a second bearing sleeve defined on the second connection element and having a second bearing sleeve longitudinal axis aligned with the first bearing sleeve longitudinal axis; and
   a bearing pin received rotatably in one of the first and second bearing sleeves, the bearing pin being received non-rotatably in the other of the first and second bearing sleeves.

6. The conveyor connector apparatus of claim 1, wherein: the first and second rotational axes are oriented at 90 degrees relative to each other.

7. The conveyor connector apparatus of claim 1, further comprising:
   at least one actuator operably associated with at least one of the first and second rotary joints for providing rotational motion of the joint central part relative to the at least one of the first and second rotary joints.

8. The conveyor connector apparatus of claim 1, further comprising:
   an actuator connected to a coupling element of the joint central part for folding-in the conveyor transport portion relative to the base portion.

9. The conveyor connector apparatus of claim 1, further comprising:
   an actuator connected between the joint central part and the second connection element and configured such that the actuator can rotate or pivot the conveyor transport portion about the rotational axis of the second rotary joint.

10. The conveyor connector apparatus of claim 1, further comprising:
    a stop element operative between the joint central part and one of the first and second connection elements for limiting the movement of the conveyor transport portion relative to the base portion.

11. The conveyor connector apparatus of claim 10, wherein:
    the stop element is adjustable so that alignment of the conveyor transport portion in the operation position is adjustable.

12. The conveyor connector apparatus of claim 1, further comprising:

a support strut configured to be connected between the joint central part and the materials processing machine.

13. The conveyor connector apparatus of claim 1, further comprising:
    the first and second rotary joints are configured such that the conveyor transport portion can be rotated or pivoted about the second rotational axis of the second rotary joint separately and independently of the folding-in movement of the conveyor transport portion about the first rotational axis of the first rotary joint.

14. A conveyor connector apparatus for a materials processing machine, the materials processing machine including a base portion and a conveyor transport portion, the base portion being connected to the materials processing machine, the conveyor connector apparatus comprising:
    a joint portion configured to connect the conveyor transport portion to the base portion, the joint portion including:
       a first connection element configured to be directly or indirectly coupled to the base portion;
       a second connection element configured to be directly or indirectly coupled to the conveyor transport portion; and
       a joint central part including a first rotary joint connected to the first connection element and configured such that the conveyor transport portion can be can be folded-in from an operation position to a transport position relative to the base portion, and a second rotary joint connected to the second connection element and configured such that the conveyor transport portion can be rotated or pivoted about a rotational axis of the second rotary joint; and
    an actuator connected to a coupling element of the joint central part for folding-in the conveyor transport portion relative to the base portion;
    wherein the coupling element of the joint central part is one of two coupling elements on opposite sides of the joint central part so that the actuator can be coupled with either of the two coupling elements.

15. A conveyor connector apparatus for a materials processing machine, the materials processing machine including a base portion and a conveyor transport portion, the base portion being connected to the materials processing machine, the conveyor connector apparatus comprising:
    a joint portion configured to connect the conveyor transport portion to the base portion, the joint portion including:
       a first connection element configured to be directly or indirectly coupled to the base portion;
       a second connection element configured to be directly or indirectly coupled to the conveyor transport portion; and
       a joint central part including a first rotary joint connected to the first connection element and configured such that the conveyor transport portion can be can be folded-in from an operation position to a transport position relative to the base portion, and a second rotary joint connected to the second connection element and configured such that the conveyor transport portion can be rotated or pivoted about a rotational axis of the second rotary joint; and
    an actuator connected between the joint central part and the second connection element and configured such that the actuator can rotate or pivot the conveyor transport portion about the rotational axis of the second rotary joint;

wherein the actuator is configured to be selectively mounted in one of two different mounting positions between the joint central part and the second connection element.

16. A conveyor connector apparatus for a materials processing machine, the materials processing machine including a base portion and a conveyor transport portion, the base portion being connected to the materials processing machine, the conveyor connector apparatus comprising:
   a joint portion configured to connect the conveyor transport portion to the base portion, the joint portion including:
      a first connection element configured to be directly or indirectly coupled to the base portion;
      a second connection element configured to be directly or indirectly coupled to the conveyor transport portion; and
      a joint central part including a first rotary joint connected to the first connection element and configured such that the conveyor transport portion can be can be folded-in from an operation position to a transport position relative to the base portion, and a second rotary joint connected to the second connection element and configured such that the conveyor transport portion can be rotated or pivoted about a rotational axis of the second rotary joint; and
   a stop element operative between the joint central part and one of the first and second connection elements for limiting the movement of the conveyor transport portion relative to the base portion;
   wherein the stop element is adjustable so that alignment of the conveyor transport portion in the folded-in transport position is adjustable.

17. A conveyor connector apparatus for a materials processing machine, the materials processing machine including a base portion and a conveyor transport portion, the base portion being connected to the materials processing machine, the conveyor connector apparatus comprising:
   a joint portion configured to connect the conveyor transport portion to the base portion, the joint portion including:
      a first connection element configured to be directly or indirectly coupled to the base portion;
      a second connection element configured to be directly or indirectly coupled to the conveyor transport portion; and
      a joint central part including a first rotary joint connected to the first connection element and configured such that the conveyor transport portion can be can be folded-in from an operation position to a transport position relative to the base portion, and a second rotary joint connected to the second connection element and configured such that the conveyor transport portion can be rotated or pivoted about a rotational axis of the second rotary joint; and
   a stop element operative between the joint central part and one of the first and second connection elements for limiting the movement of the conveyor transport portion relative to the base portion;
   at least one locking pin fixed on the joint central part; and
   the stop element being arranged on the second connection element such that the stop element abuts against the locking pin in a locked position of the second rotary joint at least in one direction of rotation of the second rotary joint, the stop element being adjustable in position relative to the second connection element.

18. A conveyor connector apparatus for a materials processing machine, the materials processing machine including a base portion and a conveyor transport portion, the base portion being connected to the materials processing machine, the conveyor connector apparatus comprising:
   a joint portion configured to connect the conveyor transport portion to the base portion, the joint portion including:
      a first connection element configured to be directly or indirectly coupled to the base portion;
      a second connection element configured to be directly or indirectly coupled to the conveyor transport portion; and
      a joint central part including a first rotary joint connected to the first connection element and configured such that the conveyor transport portion can be can be folded-in from an operation position to a transport position relative to the base portion, and a second rotary joint connected to the second connection element and configured such that the conveyor transport portion can be rotated or pivoted about a rotational axis of the second rotary joint;
   wherein a rotational axis of the second rotary joint is co-axial with a longitudinal axis of the conveyor transport portion so that the conveyor transport portion can be rotated about the longitudinal axis of the conveyor transport portion relative to the base portion.

19. A conveyor connector apparatus for a materials processing machine, the materials processing machine including a base portion and a conveyor transport portion, the base portion being connected to the materials processing machine, the conveyor connector apparatus comprising:
   a joint portion configured to connect the conveyor transport portion to the base portion, the joint portion including:
      a first connection element configured to be directly or indirectly coupled to the base portion;
      a second connection element configured to be directly or indirectly coupled to the conveyor transport portion; and
      a joint central part including a first rotary joint connected to the first connection element and configured such that the conveyor transport portion can be can be folded-in from an operation position to a transport position relative to the base portion, and a second rotary joint connected to the second connection element and configured such that the conveyor transport portion can be rotated or pivoted about a rotational axis of the second rotary joint;
   wherein a rotational axis of the second rotary joint is parallel to and laterally offset from a longitudinal axis of the conveyor transport portion so that the longitudinal axis of the conveyor transport portion can be pivoted about the rotational axis of the second rotary joint.

* * * * *

UNITED STATES PATENT AND TRADEMARK OFFICE
CERTIFICATE OF CORRECTION

PATENT NO. : 10,087,009 B2
APPLICATION NO. : 15/558081
DATED : October 2, 2018
INVENTOR(S) : Christian Welling and Felix Franzen It is certified that error appears in the above-identified patent and that said Letters Patent is hereby corrected as shown below:

In the Specification

Column 8, Line 43: insert the number --63-- after the second word "bearing"

Column 12, Line 6: insert the number --36-- after "35,"

Signed and Sealed this
Twenty-fifth Day of December, 2018

Andrei Iancu
*Director of the United States Patent and Trademark Office*